Aug. 27, 1968 P. J. GRABILL 3,398,615
METHOD AND APPARATUS FOR CUTTING ANNULAR WORKPIECES
Filed Oct. 20, 1965 5 Sheets-Sheet 1

INVENTOR.
Paul J. Grabill
BY
Harness, Dickey & Pierce
ATTORNEYS

FIG. 3.

United States Patent Office 3,398,615
Patented Aug. 27, 1968

3,398,615
METHOD AND APPARATUS FOR CUTTING ANNULAR WORKPIECES
Paul J. Grabill, Livonia, Mich., assignor to Kelsey-Hayes Company, Romulus, Mich., a corporation of Delaware
Filed Oct. 20, 1965, Ser. No. 498,220
16 Claims. (Cl. 83—49)

ABSTRACT OF THE DISCLOSURE

A method and apparatus for cutting annular workpieces to form wheel bodies. A pair of adjacently arranged rotary cutter assemblies with a plurality of circumferentially spaced cutter elements on each assembly are provided. The cutter elements on one of said assemblies are matingly engageable with the cutter elements on the other of said assemblies. Upon relative rotation of the cutter assemblies a first series of generally S-shaped slits are formed in the annular workpieces. Continued rotation of the cutter assemblies through a plurality of revolutions produces successive series of slits intersecting the first series of slits to form a circumferentially extending generally wave-shaped shear cut.

---

This invention relates generally to a method and apparatus for cutting annular workpieces and, more particularly, to a new and improved method and apparatus for forming wheel bodies of the type which are adapted to be welded or similarly secured to the inner periphery of wheel rims.

In general, the present invention is directed toward a new and improved method of forming wheel bodies which are adapted to be welded to associated wheel rims to provide unitized wheel assemblies for use on automobiles, trucks, trailers, and the like. In accordance with the principles of the present invention, the method of forming the wheel bodies is accomplished by means of a novel rotary cutting apparatus which comprises a pair of tangentially arranged work stock cutter roller assemblies that form the wheel bodies by shearing hoop-shaped or circular workpieces in a manner so as to substantially reduce material waste and therefore minimize production costs to the extreme.

It is accordingly a general object of the present invention to provide a new and improved method of apparatus for forming wheel bodies.

It is another object of the present invention to provide a new and improved method of the above character wherein material waste is substantially reduced, resulting in a corresponding reduction in production costs.

It is still another object of the present invention to provide a new and improved apparatus of the above character that comprises a pair of tangentially arranged cutter roller assemblies which are adapted to form a plurality of substantially complementary shaped wheel bodies from a single hoop-shaped workpiece.

It is yet another object of the present invention to provide a new and improved apparatus of the above character wherein each of the roller assemblies is provided with a plurality of cutting elements, and wherein each cutting element makes a progressively deeper cut into the workpiece as the rollers move relative to each other.

It is yet another object of the present invention to provide a new and improved apparatus of the above character wherein the cutting elements associated with the aforesaid roller assemblies are mounted in a manner so as to minimize tool wear.

It is a further object of the invention to provide a new and improved apparatus of the above character which is of a rugged construction, is durable in operation, and may be constructed of commercially available component parts.

Other objects and advantages of the present invention will become apparent from the following detailed description taken in conjunction with the accompanying drawings, wherein:

Figure 1:
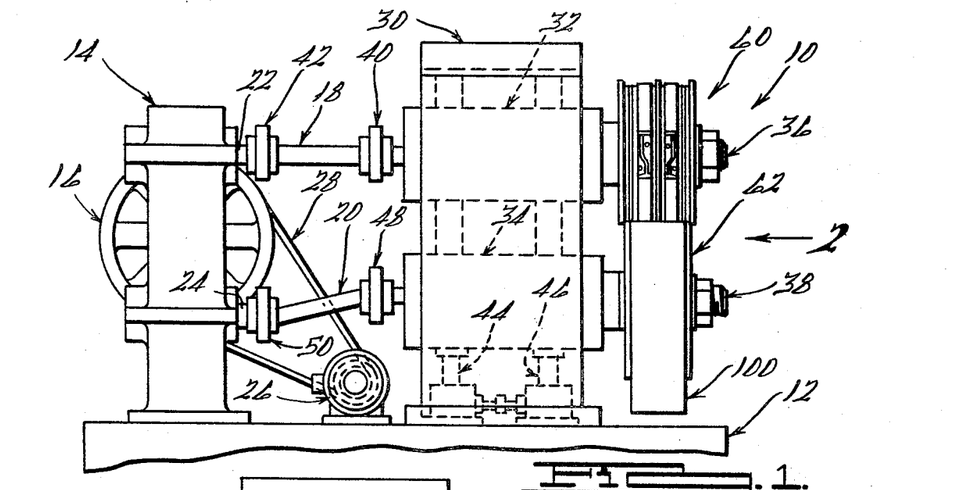
FIGURE 1 is a side elevational view of an exemplary apparatus embodying the principles of the present invention.
Figure 2:
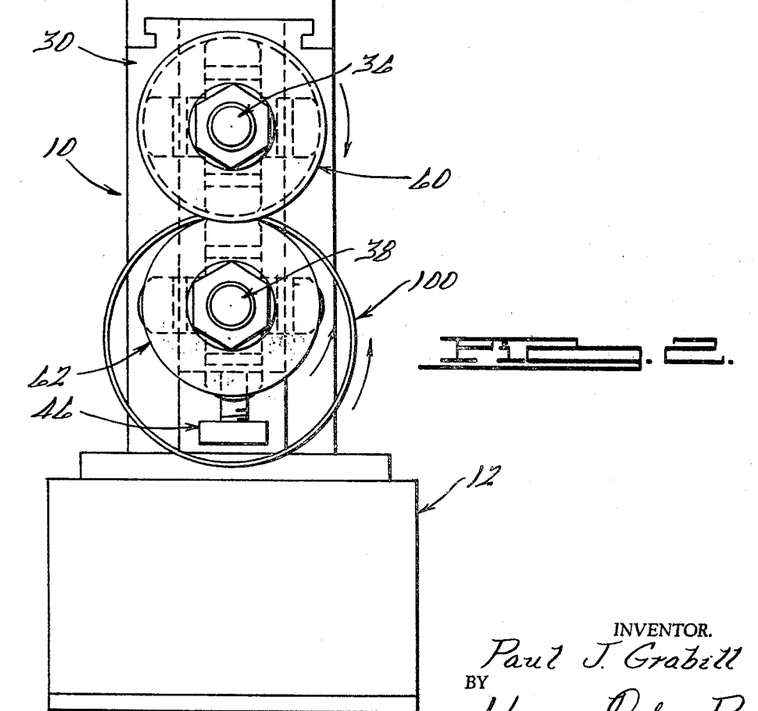
FIGURE 2 is an enlarged end elevational view of the structure illustrated in FIGURE 1, as taken in the direction of the arrow 2 thereof.

Referring now to FIGURES 1 and 2 of the drawings, a wheel body forming apparatus 10, in accordance with an exemplary embodiment of the present invention, is shown as comprising a base or support structure 12 upon which an upwardly extending pinion stand 14 is supported. A belt-driven fly wheel 16 is mounted on one side of the stand 14 and is adapted to effect rotational movement of a pair of drive shafts 18 and 20 through conventional pinion or similar type gearing (not shown) and output shafts 22 and 24, respectively, supported upon the stand 14. The fly wheel 16 is selectively rotated by means of a suitable drive motor 26 which is mounted on the support structure 12 and is operatively connected to the fly wheel 16 by means of a conventional drive belt 28.

Figure 3:
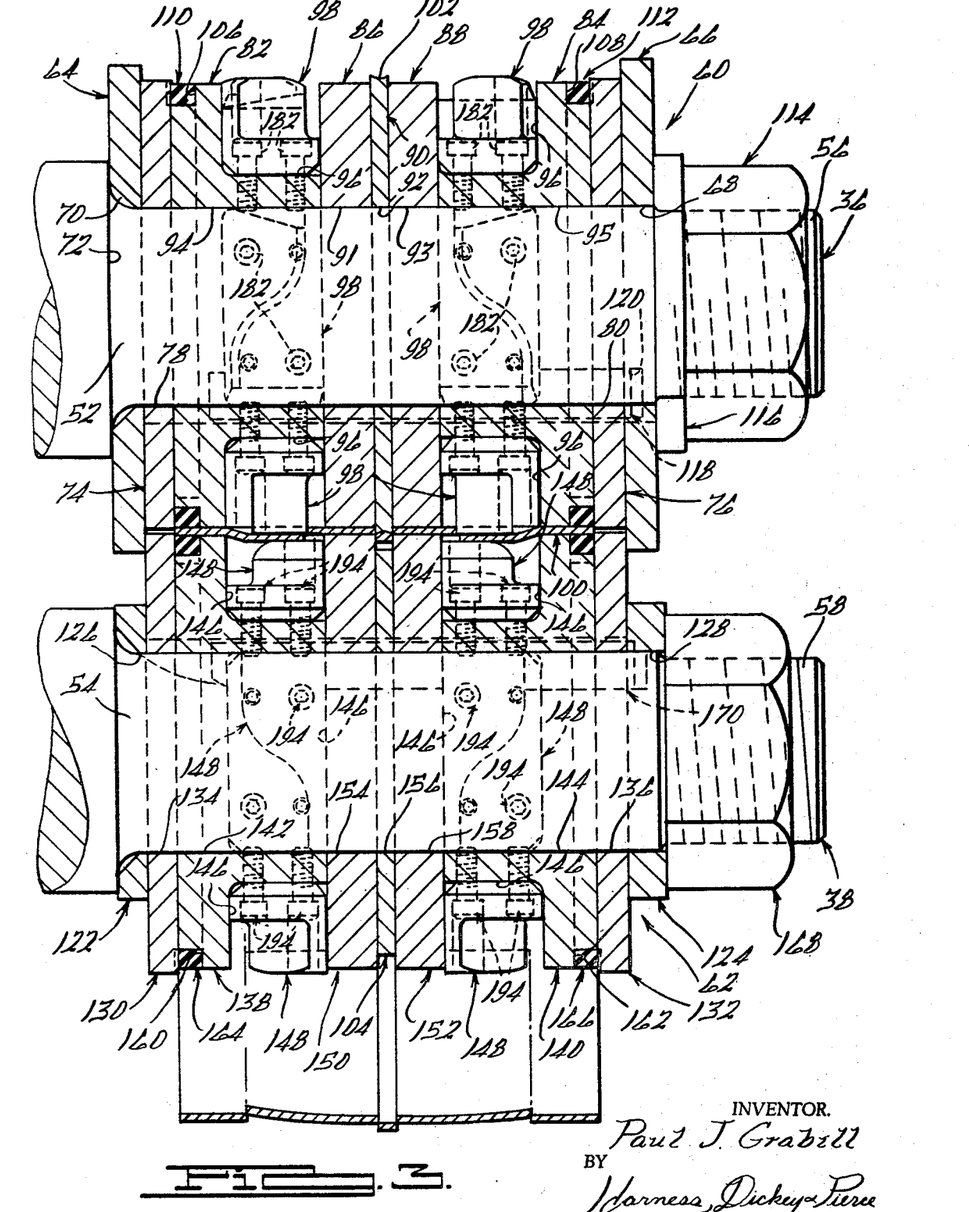
FIGURE 3 is an enlarged cross-sectional view of the work stock cutting rollers incorporated in the apparatus shown in FIGURES 1 and 2.

An upwardly extending bearing support stand, generally designated 30, is mounted upon the support structure 12 adjacent the pinion stand 14. The bearing stand 30 comprises upper and lower bearing assemblies 32 and 34 which rotatably support vertically spaced and substantially horizontally extending drive shafts 36 and 38, respectively. The bearing assembly 32 is fixedly mounted within the stand 30 with the drive shaft 36 supported therein being operatively connected to the right end of the drive shaft 18 by means of a suitable coupling mechanism 40. The opposite (left) end of the shaft 18 is connected to the output shaft 22 by means of a similar type coupling 42. Unlike the bearing assembly 32, the assembly 34 is mounted within the support stand 30 for vertical adjustable movement, which movement is provided by a pair of suitable lift jack mechanisms 44 and 46 that are supported at their lower ends upon the structure 12. Due to the aforesaid vertical adjustable movement of the bearing assembly 34, the purpose of which will be later described, the shaft 38 is operatively connected to the drive shaft 20 by means of a suitable universal joint type coupling arrangement 48. Similarly, the drive shaft 20 is connected to the output shaft 24 by means of another universal joint type coupling 50, whereby rotation of the output shaft 24 will be transmitted through the shaft 20 and couplings 48 and 50 to the shaft 38. The lift jacks 44 and 46 may be of any suitable construction and may be either hydraulically or pneumatically energized, depending upon the accommodations of the particular installation. As best seen in FIGURE 3, the outer (right) ends of the drive shafts 36 and 38 are formed with reduced diameter shank sections 52 and 54, respectively, the outer ends of which are formed with externally threaded portions 56 and 58, respectively. Mounted on the shank sections 52 and 54 is a pair of cutter roller assemblies, generally designated by the numerals 60 and 62, respectively, which are generally tangentially engageable with one another when the bearing assembly 34 is disposed in its upper position shown in FIGURE 1.

Figure 7:
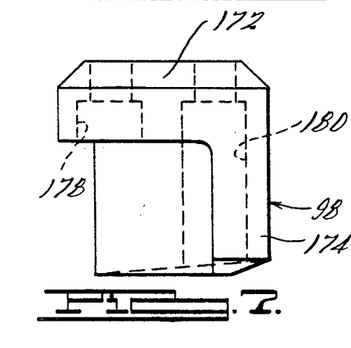
FIGURE 7 is an end elevational view of one of the cutting elements incorporated in the lowermost roller assembly illustrated in FIGURE 3.
Figure 8:
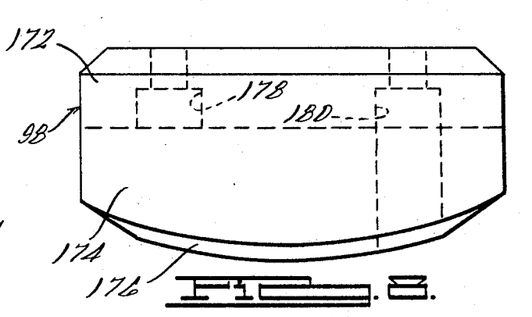
FIGURE 8 is a front elevational view of the cutting element illustrated in FIGURE 7.
Figure 9:
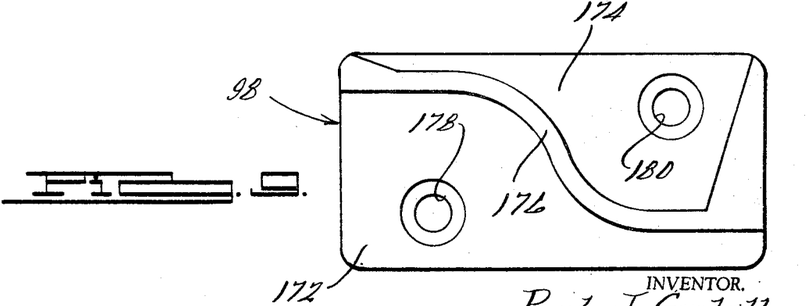
FIGURE 9 is a top elevational view of the cutting element illustrated in FIGURE 8.

Referring now in detail to the construction of the upper roller assembly 60, as best seen in FIGURE 3, the assembly 60 comprises a pair of flat annular retaining rings 64 and 66, which define central openings 68 and 70, respectively, that are adapted to receive or be supported upon the shank section 52 of the shaft 36. It will be seen that the opening 70 in the retaining ring 64 is generally chamfered to accommodate a fillet formed at the juncture of the shank section 52 and a radially outwardly projecting shoulder 72 formed on the shaft 36. Mounted adjacent the right side of the ring 64 and the left side of the ring 66 is a pair of annular guide plates 74 and 76, respectively, that have central openings 78 and 80, respectively, which are adapted to receive or be supported upon the shank section 52 of the shaft 36. Mounted adjacent the right side of the guide plate 74 and adjacent the left side of the guide plate 76 is a pair of annular cutter element support members 82 and 84 which are axially spaced from one another by a pair of annular spacer plates 86, 88 and an annular shearing blade 90 which is interposed between the plates 86 and 88. The members 86, 88 and 90 are formed with central annular openings 91, 92 and 93, respectively, and the support members 82, 84 are formed with central annular openings 94 and 95, all of which are adapted to receive or be supported upon the shank section 52 of the shaft 36 therein. As best seen in FIGURE 2, each of the support members 82 and 84 is formed with four equally circumferentially spaced cutter element support recesses, generally designated by the numeral 96. Each of the recesses 96 is generally rectangular in shape and adapted to support one of a plurality of identical upper cutter elements, generally designated by the numeral 98 and one of which will be hereinafter described in detail and is best seen in FIGURES 7 through 9. As best seen in FIGURE 3, the outer diameters of the cutter element support members 82 and 84 are substantially equal to the outer diameters of the spacer plates 86 and 88, while the guide plates 74 and 76 are slightly larger in diameter than the members 82, 84, 86 and 88 therefore extend slightly radially outwardly therefrom. The guide plates 74 and 76 function to prevent any relative axial movement between hoop-shaped workpieces, one of which is illustrated in FIGURES 1 through 3 and designated by the numeral 100, and the cutter elements 98. It will be seen that the outer periphery of the shearing blade 90 defines a shearing edge 102 which extends radially outwardly beyond the outer periphery of the members 82, 84, 86 and 88, and is adapted to cooperate with a die ring 104 on the roller assembly 62 to shear the workpiece 100 in a circumferential direction during operation of the apparatus 10, as will later be described.

The left side of the cutter element support members 82 is formed with an annular recess 106 and the right side of the support member 84 is formed with a similar annular recess 108. The recesses 106 and 108 are adapted to support a pair of annular drive rings 110 and 112, respectively, the outer peripheries of which extend slightly radially from the outer edges of the support members 82 and 84. The rings 110 and 112 are constructed of a resilient and deformable material such as urethane or the like, which may be compressed slightly and is adapted to provide for frictional engagement with the outer periphery of the workpiece 100 to cause rotation thereof around the roller assembly 62 during operation of the apparatus 10, as will later be described.

The entire assembly 60 is secured on the shank section 52 of the shaft 36 by means of a suitable nut 114 that is threadably received on the shaft section 56, a suitable washer or the like 116 being interposed between the left side of the nut 115 and the right side of the retaining ring 66. An axially extending keyway member 118 is nested within a generally rectangular shaped and axially extending recess 120 formed in the periphery of the shank section 52 and within a series of rectangular shaped cutaway portions formed in the inner peripheries of the openings 78, 91, 92, 93, 94, 95, 80 and 68, which keyway member 118 is adapted to prevent rotational movement of the roller assembly 60 relative to the shaft 36.

Figures 4, 5, 6:
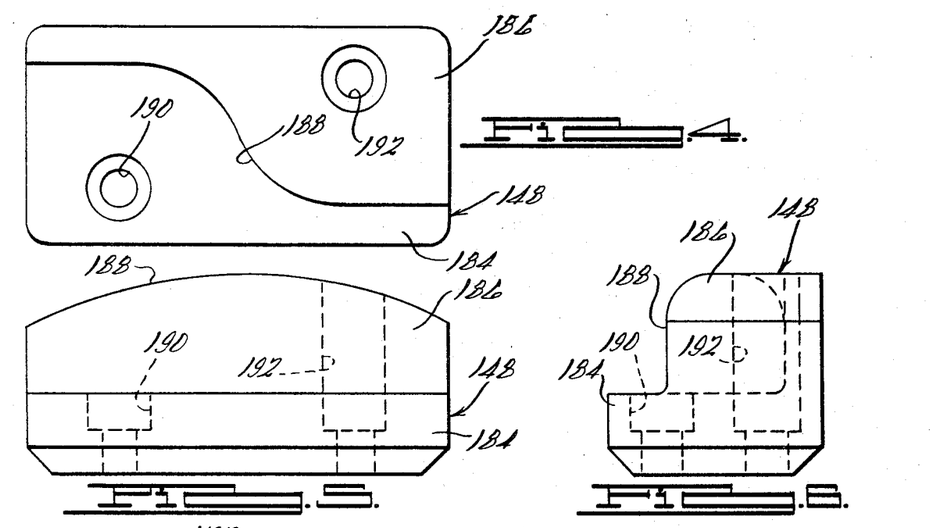
FIGURE 4 is a top elevational view of one of the cutting elements incorporated in the uppermost roller assembly shown in FIGURE 3.
FIGURE 5 is a front elevational view of the cutting element illustrated in FIGURE 4.
FIGURE 6 is an end elevational view of the cutting element illustrated in FIGURE 5.

Referring now in detail to the construction of the cutter roller assembly 62 which is operatively mounted on the shank section 54 of the lower shaft 38, as seen in FIGURE 3, the assembly 62 comprises a pair of annular retaining rings 122 and 124 which define central openings 126 and 128, respectively, that are adapted to receive or be supported upon the shank section 54 of the shaft 38. Disposed adjacent the right side of the retaining ring 122 and adjacent to the left side of the retaining ring 124 is a pair of annular guide plates 130 and 132, respectively, having central openings 134 and 136, respectively, for receiving the shank section 54. The guide plates 130, 132 are axially aligned with the guide plates 74 and 76 of the assembly 60 and are of a diameter such that the radially outer edges thereof are spaced slightly below the radially outer edges of the plates 74 and 76. It will be noted that the retaining rings 64 and 66 of the assembly 60 overlap the outer peripheral edges of the guide plates 130 and 132, and thereby serve to axially align the plates 74, 130 and 76, 132. The assembly 62 is provided with a pair of cutter element support members 138 and 140 which define central openings 142 and 144, respectively, for receiving the shank section 54 of the shaft 36. The support members 138 and 140 are adapted to be axially aligned with the members 82 and 84 of the assembly 60 and are substantially identical in construction thereto. Each of the members 138, 140 is formed with four equally circumferentially spaced cutter element support recesses, generally designated 146, the recesses 146 being generally rectangular in shape and adapted to support one of a plurality of identical lower cutter elements 148, one of which will be later described in detail and is shown in FIGURES 4 through 6. The support members 138 and 140 are supported upon the shaft 38 in a manner such that the recesses 146 of the member 138 are radially aligned with the recesses 146 of the support member 140 and such that the cutter elements 148 are adapted to radially align with the cutter elements 98 of the assembly 60 along an imaginary plane extending vertically through the shafts 36 and 38, as will later be described. Interposed between the right side of the support member 138 and the left side of the support member 140 is a pair of spacer plates 150 and 152, respectively, between which the annular die ring 104 is located. The members 150, 104 and 152 are formed with aligned openings 154, 156 and 158 respectively, which are adapted to receive or be supported upon the shank section 54 of the shaft 38. It will be seen that the diameter of the ring 104 is somewhat smaller than the diameter of the spacer plates 150 and 152, enabling the outer peripheral shearing edge 102 of the shear blade 90 to project into the annulus defined between the plates 150, 152 and the radially outer edge of the die ring 104. With this construction, upon relative rotational movement of the roller assemblies 60 and 62, the shearing blade 90 will function to circumferentially shear the workpiece 100 into two identical workpieces, as will later be described. The left side of the radially outer edge of the support member 138 and the right side of the radially outer edge of the support member 140 are formed with annular recessed portions 160 and 162, respectively, within which a pair of drive rings 164 and 166, respectively, are mounted. The drive rings 164, 166 are preferably identical to the aforedescribed drive rings 110 and 112 in the assembly 60 and cooperate with the rings 110, 112 to frictionally engage the inner periphery of the workpiece 100 so that the workpiece will rotate in a predetermined manner during operation of the apparatus 10. As in the roller assembly 60, the guide plates 130 and 132 of the assembly 62 extend radially outwardly from the outer periphery of the support members 138 and 140 to preclude any axial movement of the workpiece 100 relative to the cutter elements 148. The entire assembly 62 is maintained on the shank section 54 of the shaft 38 by means of a conventional nut 168 that is threaded on the end portion 58 of the shaft 38. Relative rotational movement between the assembly 62 and the shank section 54 of the shaft 38 is precluded through the provision of a keyway member 170 which is mounted on the shank section 54 of the shaft 38 in a manner identical to the way the keyway member 118 is mounted on the shaft 36.

Referring now in detail to the construction of the cutter elements 98 which are operatively associated with the roller assembly 60, as best seen in FIGURES 7 through 9, the elements 98 comprise generally flat rectangular base portions 172 and cutting edge portions 174 which are formed integral with the base portions 72 and define generally S-shaped cutting edges 176, as best seen in FIGURE 9. As illustrated in FIGURE 8, the cutting edges 176 are generally arcuate shaped in side elevational view, with the intermediate portions of the edges 176 spaced further away from the base portions 172 than the opposite ends of the edges 176. Thus, each of the cutter elements 98 makes a progressively deeper bite into the workstock as the center of the cutting edges 176 thereof approaches an imaginary plane extending vertically between the shafts 36 and 38. A pair of countersunk bores 178 and 180 are formed in each of the cutter elements 98 and are adapted to receive suitable screws, bolts or the like, generally designated 182 (which are used to fixedly secure the cutter elements 98 within their associated recesses 96 of the support members 82 and 84.

Referring now to the cutter elements 148 which are adapted to be operatively mounted on the roller assembly 62, as best seen in FIGURES 4 through 6, the elements 148 are very similar in construction to the above described elements 98 and are formed with rectangular shaped lower base portions 184 and with cutting edge portions 186 which are formed integral with base portions 184 and are spaced upwardly therefrom. As best seen in FIGURE 4, the portions 186 of the elements 148 define generally S-shaped cutting edges 188 which, as illustrated in FIGURE 5, are generally arcuate in contour with the intermediate portions thereof being spaced further away from the base portions 184 from the opposite ends thereof. The elements 148 are each formed with a pair of countersunk bores 190 and 192 which are adapted to receive suitable screws, bolts and the like 194 for securing the elements 148 within the recesses 146 of the support members 138 and 140.

The cutter elements 98 and 148 are supported within the recesses 96 and 146, respectively, in a manner such that the cutting edges 176 and 188, respectively, project slightly radially outwardly from the nominal diameter of the roller assemblies 60 and 62, i.e., beyond the outer surfaces of the assemblies 60 and 62 with which the workpiece 100 is normally engaged. The elements 98 and 148 are arranged within the recesses 96 and 146 in a manner such that the S-shaped configuration of the cutting edges thereof matingly engage each other as the assemblies 60 and 62 rotate relative to one another. More particularly, the elements 98 and 148 are arranged such that as the shaft 36 rotates the support members 82 and 84 and hence the elements 98, the elements 98 on the lower side of the shaft 36 align with an imaginary plane extending vertically through the shafts 36, 38 and matingly engage the elements 148 on the support members 138 and 140 as these elements are aligned with the aforesaid imaginary plane upon rotation of the shaft 38. By virtue of the fact that the elements 98 and 148 are equally circumferentially spaced around the peripheries of the roller assemblies 60 and 62, respectively, when the shafts 36 and 38 rotate at the same speed and in opposite directions, each axially aligned pair of cutter elements 98 on the roller assembly 60 will matingly engage an associated pair of axially aligned cutter elements 148 on the assembly 62.

The cutter roller assemblies 60 and 62 and more particularly the cutter elements 98 and 148 secured around the outer peripheries thereof, along with the annular shearing blade 90, are adapted to shear the workpiece 100 into four identical workpieces, each of which will ultimately constitute a separate wheel body. That is, the shearing blade 90 of the apparatus 10 is adapted to shear the workpiece 100 circumferentially, whereby to provide a pair of annular workpieces 196 and 198, as shown in the developed view of FIGURE 12. These two workpieces 196 and 198 are in turn each adapted to be sheared by the interaction of the cutter elements 98 and 148 into two identical workpieces 200, 202 and 204, 206. Each of the workpieces 200, 202, 204 and 206 is provided with one circumferential side which is substantially uniform or straight and an opposite edge of which is generally undulating or wave-shaped. It will be noted that the two workpieces 200, 202, 204 and 206 which are formed from each of the workpieces 196 and 198 have their undulating edges facing toward each other, which edges are complementary in shape, for reasons later to be described.

To correlate the various above described component members of the apparatus 10 embodying the present invention, together with providing a detailed description of the operation of the cutter elements 98 and 148 of the roller assemblies 60 and 62, respectively, an exemplary operational cycle of the apparatus 10 will now be given.

Figures 10, 11, 12:
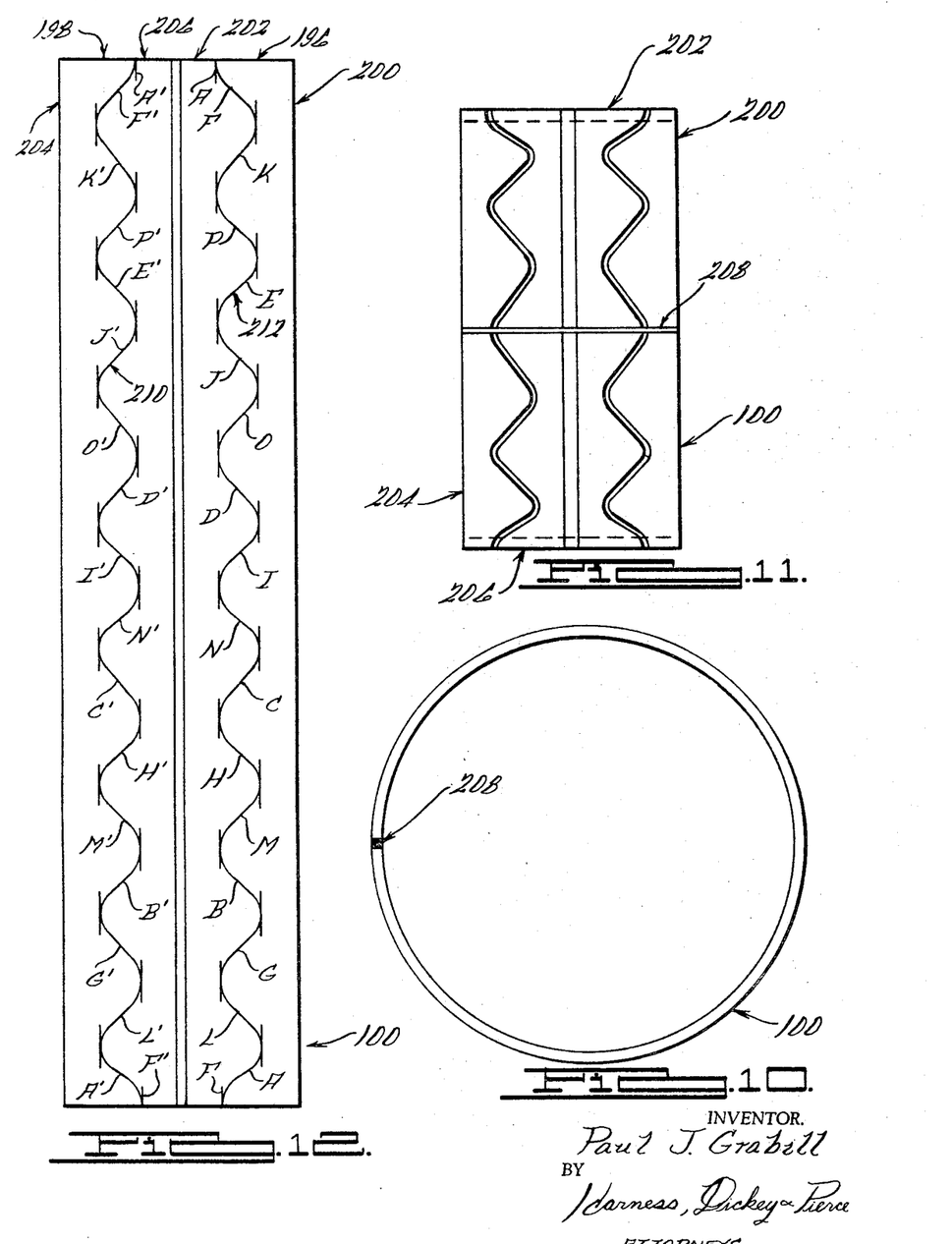
FIGURE 10 is a side elevational view of a typical workpiece adapted to be processed by the apparatus embodying the present invention.
FIGURE 11 is a side elevational view of the workpiece illustrated in FIGURE 10 after the same has been formed into a plurality of wheel body members by the apparatus of the present invention.
FIGURE 12 is a developed view of the structure illustrated in FIGURE 11.

Initially, the workpiece 100 is formed by rolling a flat elongated strip of metal into a circular shape, the ends of the strip thereafter being rigidly secured to one another, as by butt welding or the like, as seen at 208 in FIGURE 10. The width of the material or workpiece 100 is selected to be slightly smaller than the axial length between the confronting sides of the guide plates 74, 76 and 130, 132. After the workpiece 100 has been thus formed, the lift jacks 44 and 46 of the apparatus 10 are actuated to lower the bearing assembly 34 and roller assembly 62 which is supported thereby. When the assembly 62 has been lowered or moved away from the lower edge of the roller assembly 60, the workpiece 100 may be placed over the roller assembly 62 and be properly positioned thereon relative to the guide plates 130 and 132, as best seen in FIGURES 2 and 3. Thereafter, the lift jacks 44 and 46 are actuated to elevate the roller assembly 62 to the position indicated in FIGURE 3 where the assembly 62 is substantially tangentially engaged with the lower side of the roller assembly 60. After the roller assembly 62 and workpiece 100 supported thereon have been thus positioned relative to the roller assembly 60, the drive motor 26 may be energized, which results in rotation of the fly wheel 16 and drive shafts 18, 36 and 20, 38. The gearing within the pinion stand 14 is such that the drive shaft 36 will rotate in a clockwise direction in FIGURE 2, and the drive shaft 38 will rotate in a counterclockwise direction, which results in the workpiece 100 also moving in a counterclockwise direction, as will be apparent.

Generally speaking, relative rotation of the roller assemblies 60 and 62 will result in the cutter elements 98 and 148, along with the shearing blade 90, shearing the workpiece 100 into the plurality of identical annular workpieces 200, 202, 204 and 206, as hereinabove described. Of course, it will be apparent how the interaction of the shearing blade 90 and die ring 104 operate to shear the workpiece 100 into two identical "sub" workpieces 196 and 198, since the members 90 and 104 coact in a manner consistent with well known material cutting or shearing techniques; however, the interaction of the cutter elements 98 and 148 on the roller assemblies 60 and 62 in forming the pair of undulating or wave shaped cuts indicated at 210 and 212 in FIGURE 12 will not be as readily apparent and is described in detail as follows.

Upon relative rotation of the roller assemblies 60 and 62, the matingly engageable pairs of cutter elements 98 and 148 form a series of generally S-shaped slits or cuts in the workpiece 100. As illustrated in the developed view of the workpiece 100 in FIGURE 12, the plurality of slits thus formed are arranged in two axially spaced and circumferentially aligned rows, the cutter elements 98 and 148 on the roller support members 82 and 138 forming one row of S-shaped slits, and the cutter elements 98 and 148 on the support members 84 and 140 forming the other row of S-shaped slits. The diameter of the workpiece 100, together with the diameter of the roller assemblies 60 and 62 and the relationship of the circumferential spacing of the cutter elements 98 and 148 thereto, are such that the undulating shear lines 210 and 214 are completed after four complete revolutions of the assemblies 60 and 62. That is, each of the undulating shear lines comprises 16 S-shaped slits or four slits made by each of the four pairs of interengaging cutter elements 98 and 148. The slits are formed in the workpiece 100 such that the opposite ends thereof overlap the ends of the next adjacent slits so that the "sub" workpieces 196 and 198 are completely sheared into the four wheel body shaped workpieces 200, 202, 204 and 206 upon completion of the four revolutions of the assemblies 60 and 62. As the roller assemblies 60 and 62 rotate, a first pair of shaped slits A and A' are formed in the workpieces 196 and 198 by the first pair of interengaging cutter elements 98 and 148, as seen in FIGURE 12. Upon further rotation of the assemblies 60 and 62, the S-shaped slits B and B' are formed in the workpieces 196 and 198, as are the slits C and C' and D and D', at which time the assemblies 60 and 62 have each made one complete revolution. As the assemblies 60 and 62 begin their second revolution, the pairs of cutter elements which formed the slits A and A' form slits E and E'. In a similar manner, the cutter elements which formed the slits B, C and D and B', C' and D' form the S-shaped slits F and F', G and G', and H and H', thereby completing the second revolution of the assemblies 60 and 62. During the third revolution of the assemblies 60 and 62, the S-shaped slits I and I', J and J', K and K', and L and L', are formed. Finally, during the fourth revolution of the assemblies 60 and 62, the S-shaped slits M and M', N and N', O and O', and P and P' are formed. It will be noted that only the radially outermost portions of the cutter elements 98 and 148 are relied upon to provide a sufficient depth of shear in the workpiece 100 and that the end portions of the cutting edges 176 and 178 which are spaced radially inwardly from the center of these cutting edges provide for a smooth lead-in and lead-out to reduce tool wear. As stated above, since the adjacent ends of the various S-shaped slits overlap each other, the workpieces 200 and 202 of the workpiece 196 will be separated and similarly the workpieces 204 and 206 of the workpiece 198 will be separated, resulting in four identical workpieces being formed from the single original workpiece 100. Upon completion of four revolutions by the roller assemblies 60 and 62, the lift jacks 44 and 46 may be deenergized to effect lowering of the assembly 62 and thereby permit removal of the workpieces 200, 202, 204 and 206 from the apparatus 10 and permit a new workpiece 100 to be mounted on the assembly 62 preparatory to the next operational cycle of the apparatus 10.

Figure 13:
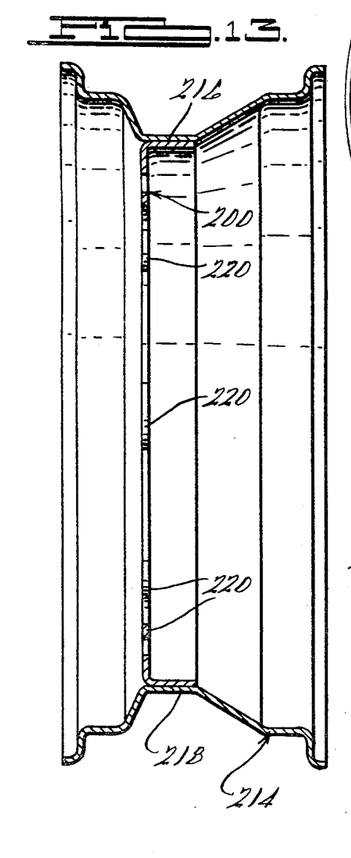
FIGURE 13 is a cross-sectional view of a wheel body constructed in accordance with the principles of the present invention as shown in operative association with a typical wheel rim.
Figure 14:
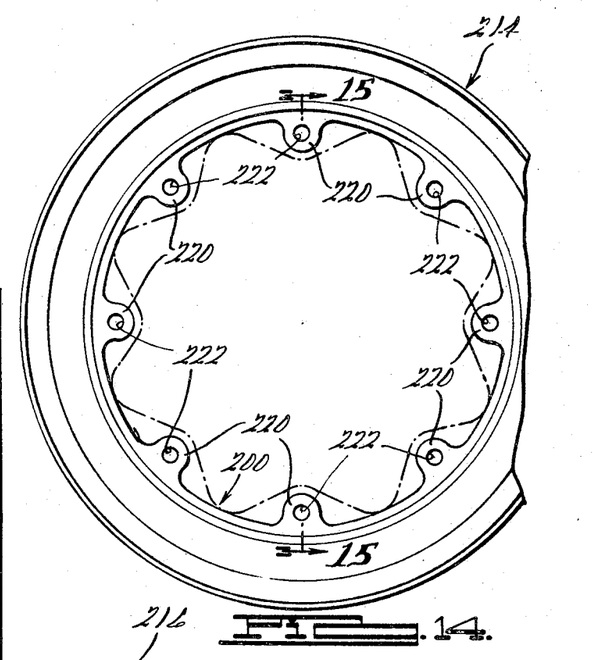
FIGURE 14 is a side elevational view of the structure illustrated in FIGURE 13.
Figure 15:
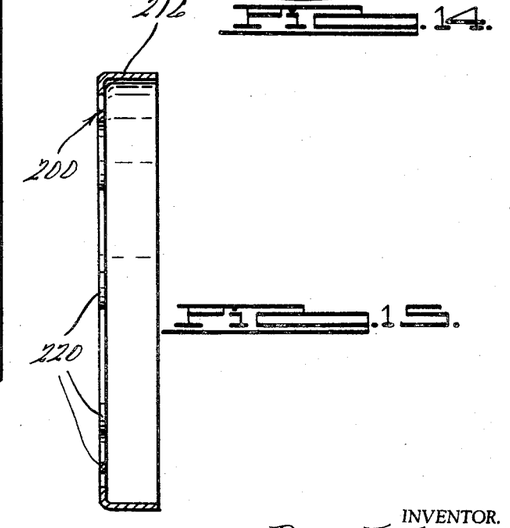
FIGURE 15 is a cross-sectional view of the wheel rim illustrated in FIGURE 14, as taken substantially along the line 15—15 thereof.

Prior to the various workpieces or wheel body members 200, 202, 204 and 206 being mounted within their associated wheel rims, one of which is shown in FIGURE 13 and designated by the numeral 214, to provide unitized wheel assemblies for use on automobiles, trucks, trailers or the like, each of the individual members 200, 202, 204 and 206 is subjected to a stamping operation wherein a marginal portion of the axially extending side thereof which defines the flat or straight circumferentially extending edge (opposite the undulating edge) is bent approximately 90 degrees. This is best seen in FIGURES 13 and 15 wherein the workpiece 200 has the marginal edge portion 216 thereof thus formed, whereby to form a cylindrical flange section which is adapted to be welded or similarly secured to an inner peripheral section 218 of the wheel rim 214. After the members 200, 202, 204 and 206 have been thus formed and secured to their associated wheel rims, each is subjected to one final stamping operation which is best illustrated in FIGURE 14. During the course of this operation, the radially inwardly projecting portions of the members 200, 202, 204 and 206, which are defined by the undulating or wave shaped shear cuts 210 or 212, are stamped out in a manner such that a plurality of radially inwardly projecting semicircular flange sections, generally designated 220, are formed. That is, the radially inwardly extending portions of the wheel body members, for example, the workpiece 200 in FIGURE 14, is stamped along the solid line in FIGURE 14, whereby the material defined between this line and the dotted line constituting the original undulating shear line 212 is removed. A plurality of bolt holes, generally designated 222, may be formed in the flange sections 220 simultaneously when or subsequent to the aforesaid stamping operation, which holes 222 are adapted to receive suitable screws, bolts or the like for securing the unitized assembly comprising the wheel rims 214 and wheel body members 200, 202, 204 and 206 to associated brake drums or the like.

A particular feature of the above described methods and apparatus of the present invention resides in the fact that the wheel bodies that are produced effect a substantial saving in material waste, as compared with heretofore known and used techniques for forming similar type wheel bodies. In particular, it will be seen that the undulating or wave-shaped edges of the wheel body members are of a complementary configuration with respect to one another in a manner such that the portions thereof which ultimately form the flange sections 220 overlap each other when the adajacent workpieces are positioned as seen in FIGURE 11. Accordingly, associated material and production expenses in manufacturing wheel bodies in accordance with the principles of the present invention will be minimized to the extreme.

It may be noted that for manufacturing convenience, four wheel body members 200, 202, 204 and 206 were formed from the single workpiece 100. It will be apparent, however, that if desired, only one cutter element support member could be provided on each of the shafts 36 and 38 to provide for shearing a single workpiece, which is only half as wide as the heretofore described workpiece 100, into only two wheel body members.

While it will be apparent that the exemplary embodiment herein illustrated is well calculated to fulfill the objects above stated, it will be appreciated that the method and apparatus of the present invention is susceptible to modification, variation and change without departing from the proper scope or fair meaning of the subjoined claims.

What is claimed is:

1. In the method of shearing an annular workpiece in a manner so as to form two bands having generally waved-shaped edge portions, the steps which include,
   successively engaging the inner and outer peripheral sides of the workpiece with generally arcuate-shaped cutting elements to form a plurality of circumferentially spaced arcuate slits in the workpiece,
   simultaneously providing for relative rotational movement between the workpiece and the cutting elements,
   re-engaging the inner and outer peripheral sides of the workpiece with the cutting elements to form another plurality of arcuate slits spaced circumferentially from and intersecting said first set of slits.

2. In an apparatus for forming annular workpieces,
   a pair of adjacently arranged rotary cutter assemblies,
   means supporting said assemblies for rotational movement in opposite directions,
   a cutter element on each of said assemblies,
   said elements being matingly engageable with one another, and
   means for rotating said assemblies whereby said cutter elements engage the inner and outer peripheral sides of a workpiece to form a plurality of intersecting arcuate-shaped slits in the workpiece which define a circumferentially extending generally waved-shaped shear cut.

3. In an apparatus for forming annular workpieces,
   first and second cutter roller assemblies,
   means supporting said assemblies for rotation in opposite directions relative to one another,
   at least one cutter element on each of said assemblies, and
   means for rotating said assemblies relative to the workpiece whereby said cutter elements form a set of arcuately shaped slits in the workpiece, said cutter elements being arranged on said assemblies whereby each set of arcuately shaped slits formed thereby is circumferentially spaced around the workpiece from another set of slits.

4. In an apparatus for forming annular workpieces,
   a pair of tangentially arranged cutter roller assemblies,
   means supporting said assemblies for rotation in opposite directions relative to one another,
   matingly engageable cutter elements mounted on each of said assemblies,
   said cutter elements having means thereon defining cutting edges which when engaged with the workpiece form a set of generally arcuate-shaped circumferentially spaced slits in the workpiece,
   means for moving said workpieces relative to said cutter elements in a manner such that the slits formed thereby are substantially circumferentially aligned with each other, said cutter elements being arranged on said assemblies whereby each set of arcuately shaped slits formed thereby is circumferentially spaced around the workpiece from another set of slits.

5. The invention as set forth in claim 4 wherein said cutter elements are arranged on said roller assemblies in a manner such that said slits formed in the workpiece intersect one another.

6. The invention as set forth in claim 4 wherein said means on said cutter elements define generally S-shaped cutting edges.

7. The invention as set forth in claim 4 wherein said cutter elements are arranged on said roller assemblies such that said cutting edges form a generally wave-shaped edge portion on the workpiece.

8. The invention as set forth in claim 4 wherein said cutter elements are arranged on said roller assemblies such that a plurality of substantially parallel generally wave-shaped shear cuts are formed in the workpiece.

9. In an apparatus for forming wheel bodies from annular workpieces,
   a pair of adjacently arranged rotary cutter assemblies,
   means supporting said assemblies for rotational movement in opposite directions,
   means for moving one of said assemblies toward and away from the other of said assemblies,
   each of said assemblies comprising at least one cutter element support member,
   a plurality of circumferentially spaced cutter elements on each of said assemblies,
   the cutter elements on one of said assemblies being matingly engageable with the cutter elements on the other of said assemblies,
   means on said assemblies engageable with a workpiece for rotating the same upon rotation of said assemblies, and
   means for rotating said assemblies whereby said cutter elements engage the inner and outer peripheral sides of the workpiece to form a plurality of intersecting generally S-shaped slits in the workpiece which define a circumferentially extending generally wave-shaped shear cut.

10. The invention as set forth in claim 9 which includes guide means on said roller assemblies for preventing axial movement of the workpieces relative to said cutter elements.

11. The invention as set forth in claim 9 which includes an annular shearing element on one of said assemblies for forming a substantially straight edge portion on the workpiece.

12. The invention as set forth in claim 9 wherein said support members are formed with four equally circumferentially spaced recessed portions each of which is adapted to have one of said cutter elements mounted therein.

13. In an apparatus for forming wheel bodies and the like,
   a pair of adjacently arranged rotary cutter assemblies,
   means including shaft means supporting said assemblies for rotary movement in opposite directions,
   each of said assemblies comprising a pair of annular cutter element support members arranged coaxially of said shaft means,
   each of said support members being formed with a plurality of equally circumferentially spaced recessed portions,
   a cutter element defining a generally S-shaped cutting edge disposed in each of said recessed portions,
   an annular shearing blade interposed between the pair of support members on one of said assemblies,
   a pair of guide plates arranged axially of each of said pair of support members for preventing axial movement of a workpiece relative to the cutter elements,
   at least one deformable drive ring on each of said assemblies for engaging the inner and outer peripheral sides of a workpiece to rotate the same during rotation of said assemblies, and
   means for rotating said assemblies whereby said cutter elements engage the workpiece to form a plurality of intersecting slits therein which define a pair of circumferentially extending generally wave-shaped shear cuts, and whereby said shearing blade forms a substantially straight circumferentially extending shear cut interjacent said wave-shaped cuts.

14. In the method of forming an annular workpiece having a generally wave-shaped edge portion, the steps which include, successively engaging a pluarality of annularly arranged generally S-shaped cutting edges with the inner and outer peripheral sides of the workpiece to form a first plurality of arcuately shaped slits therein, and moving the workpiece relative to the cutting edges and thereafter reengaging the cutting edges with the workpiece to form a second plurality of arcuate shaped slits substantially circumferentially aligned with and intersecting said first plurality of slits.

15. In the method of shearing an annular workpiece to form two bands having wave-shaped edge portions, the steps which include, successively engaging the inner and outer peripheral sides of the workpiece with a plurality of generally S-shaped cutting edges to form first and second sets of spaced generally arcuately shaped slits in the workpiece, simultaneously providing for relative rotational movement between the workpiece and the cutting edges, successively reengaging the inner and outer peripheral sides of the workpiece with the plurality of cutting edges to form third and fourth sets of spaced slits in the workpiece, said third and fourth sets of slits being formed in the workpiece at positions circumferentially aligned with and at least partially overlapping the first and second sets of slits, and engaging the workpiece with a shearing element interjacent said first and second sets of slits to circumferentially shear the workpiece upon relative rotational movement between the workpiece and the cutting edges.

16. The method according to claim 15 wherein the workpiece is continuously rotated relative to the cutting edges.

References Cited

UNITED STATES PATENTS

| | | | |
|---|---|---|---|
| 310,894 | 1/1885 | Jordan | 83—187 X |
| 678,901 | 7/1901 | Prael | 83—187 X |
| 1,459,472 | 6/1923 | Krause | 83—333 X |
| 1,748,981 | 4/1930 | Harris | 83—920 X |
| 2,335,720 | 11/1943 | Yeomans | 83—49 X |
| 2,352,118 | 6/1044 | Poupitch. | |
| 2,799,336 | 7/1957 | Rouff | 83—917 X |
| 3,083,926 | 4/1963 | Herr | 83—36 X |
| 3,258,380 | 6/1966 | Fischer et al. | 83—678 X |

JAMES M. MEISTER, *Primary Examiner.*